United States Patent Office 3,391,989
Patented July 9, 1968

3,391,989
PREPARATION OF VOLATILE METAL
CHLORIDES FROM THEIR ORES
Bryan R. Hollebone and Donald R. Wiles, both of Department of Chemistry, Carleton University, Ottawa, Ontario, Canada
No Drawing. Filed Sept. 17, 1964, Ser. No. 397,334
Claims priority, application Canada, Jan. 2, 1964, 892,470
6 Claims. (Cl. 23—15)

ABSTRACT OF THE DISCLOSURE

A process is disclosed whereby ores of certain metals such as zirconium, niobium, tantalum and molybdenum, can be converted into the volatile anhydrous chlorides of these metals. Pyridinium chloride in the molten state is used as the chlorinating agent. It melts at 145° C. so that water distills off from the reaction mixture. It also sublimes easily in vacuum leaving the metal chloride which sublimes at a somewhat higher temperature leaving the insoluble gangue as a residue. It thus is possible using a single vessel and controlling the vacuum and temperature to effect the dissolution of the ore, removal and recovery of excess reagent, and separation of the anhydrous metal chloride.

This invention refers to the treatment of certain ores and concentrates in non-aqueous acid media in such a way as to produce the volatile chlorides of some of the metals contained therein. Subsequent treatment of these volatile chlorides—separation, purification and reduction to the metal—can be carried out by methods which are now standard.

The method to be described is an improvement over currently used methods in that it (i) avoids the use of hydrogen fluoride, (ii) does not involve high temperature reactions with corrosive gases such as chlorine, and (iii) produces no large quantities of noxious or corrosive gases. A further advantage is that the essential parts of the reaction are identical for all metals claimed, so that a very great versatility of equipment is made possible. The present method is based on the properties of hydrogen chloride when dissolved in non-aqueous bases, in particular tertiary amines, but also including secondary and primary amines and ammonium chloride.

The chemistry of this type of acid has been discussed in general terms by Audrieth, Long and Edwards [J. Amer. Chem. Soc., 59, 1576 (1937)] and by Starke [Can. J. Research, 28B, 225 (1950)]. Use of this method to prepare anhydrous compounds was made by Pappas and Wiles [J. Inorg. Nucl. Chem. 2, 69 (1956)] who prepared a compound claimed to be $(PyH)_2UCl_6$, and by Didtschenko [Didtschenko (Trans. AIME, 215, 401 (1959))] who prepared anhydrous cerium and thorium chlorides from the hydrated chlorides. Hollebone [B. Sc. thesis, Carleton University, April 1963] prepared for the first time volatile anhydrous chlorides of several metals, starting from the metal itself or from the oxide. The present invention involves the application of this chemistry to the treatment of ores of certain metals and other materials which dissolve with difficulty in water, so as to obtain the volatile chlorides of these metals free from the solvent and from non-volatile materials.

If the base is represented as B, and its hydrochloride as BHCl, then it is possible to set up model equations as applying to a metal in, for example, its +5 oxidation state. The first reaction involves the dissolution of the oxide:

$$M_2O_5 + 12BHCl \rightarrow 2BHMCl_6 + 10B + 5H_2O \quad (I)$$

The second reaction shows the dissociation of the complex chloride on heating:

$$BHMCl_6 \rightarrow BHCl + MCl_5 \quad (II)$$

A further point of interest is that Reaction I has an exact counterpart in the dissolution of sulphides, in which case hydrogen sulphide is produced as the volatile product. This is illustrated by Equation Ia, in which M' designates a divalent metal.

$$M'S + 4BHCl \rightarrow (BH)_2M'Cl_4 + 2B + H_2S \quad (Ia)$$

Similar reactions will also occur in the case of carbonaceous ores and silicaceous ores:

$$M'CO_3 + 4BHCl \rightarrow (BH)_2M'Cl_4 + CO_2 + 2B + H_2O \quad (Ib)$$

In the case of some ores, both oxides and silicates, it may be necessary to fuse the ore with a basic flux, such as sodium hydroxide, to improve the rate of dissolution. The dissolution reaction (Ic) is nevertheless similar:

$$M_2O_5 + 6NaOH \rightarrow 2Na_3MO_4 + 3H_2O$$
$$Na_3MO_4 + 9BHCl \rightarrow BHMCl_6 + 3NaCl + 8B + 4H_2O \quad (Ic)$$

This sort of reaction is not energetically favourable in aqueous solution for most metals of high oxidation state, because of the stability of the hydrolysis products formed on dilution, neutralization or, in some cases, on heating:

$$2BHMCl_6 + 5H_2O \rightarrow M_2O_5 + 2BHCl + 10HCl \quad (III)$$

With respect to the reactions given as I to III, it must be emphasized that the chemical nature of the intermediate product, shown here as $BHMCl_6$ and $(BH)_2M'Cl_4$, is not known, despite several studies on the problem. However, the end result is the same, and dissociation into the volatile chloride does not in general depend on the exact composition of the intermediate, which need not be isolated. With a few metals, for example, copper and chromium, complex ions are formed involving the base as a ligand. These will not dissociate as simply as is indicated in Equation II. Moreover, since pyridine is a reducing agent, too vigorous heating at an early stage may cause reduction of the metal chloride to a lower oxidation state. Since this usually results in decreased volatility excessive reduction is to be avoided.

In our studies we have used pyridine as a typical base for the investigation of these reactions. Pyridine hydrochloride is a most suitable reagent for this type of reaction. It is readily obtained pure and, on recovery, is easily repurified. Its melting and boiling temperatures (144–146° C. and 216–218° C.) respectively, provide an ease of handling which is uncommon among reagents used for ores such as those of niobium and zirconium. It sublimes easily in vacuo without appreciable dissociation, and is readily recoverable. Spent pyridine, that is, pyridine produced in reaction I, is easily converted to the hydrochloride by addition of hydrochloric acid and distillation. Perhaps most important, in view of the detrimental effect of water, as shown in Reaction III, the melting point of this solvent is well above the boiling point of water. Thus, any water present in the ore, formed as in Reaction I, or inadvertently allowed to enter the system is readily removed. Removal of water is doubtless made more effective in that an azeotrope is formed by pyridine and water, which boils at a temperature (94° C.) lower than the boiling point of either constituent.

In order that the invention may be more clearly understood, the following preferred embodiments thereof are now described, by way of example only.

Example 1

Pyrochlore from the Oka, Quebec, area containing tantalum and niobium was dissolved directly in pyridine hydrochloride refluxing at its boiling point. The dissolution was slow, and although finer grinding of the ore helped the dissolution, no more than 21% of the ore was dissolved during 18 hours in a three-fold excess of pyridine hydrochloride.

Example 2

Pyrochlore was fused with a basic flux, such as sodium hydroxide, sodium peroxide or sodium pyrosulphate being used, and it then dissolved readily in refluxing pyridine hydrochloride. A white insoluble substance which forms during the dissolution was identified as sodium chloride, which forms as shown in Equation IV:

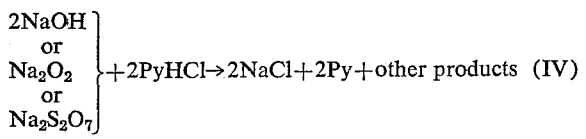

The pyridine produced was collected with essentially quantitative recovery and reconverted to the hydrochloride.

Example 3

Finely powdered (Tyler mesh size $<-100$) ferro niobium (ferro-columbium) was treated with pyridinium chloride as above, and was found to react vigorously to give a solution of the chlorides.

Example 4

The solution of pyrochlore in pyridine hydrochloride was heated in vacuo (or under dry HCl at a pressure of 1–2 cm. Hg) to sublime or distill off the excess pyridine hydrochloride, which can be recovered for re-use. A temperature in the range of 160–180° C. was found satisfactory and 60% of the initial pyridine hydrochloride was recovered as sublimate. This amount corresponded to about 80% of that still present after the dissolution reaction.

Use of too high a temperature, especially in the presence of an atmosphere of air, chlorine, carbon tetrachloride, chloroform or other gas, causes extensive pyrolysis of the pyridine, with resultant loss of efficiency, and probable chemical reduction of the niobium to a lower oxidation state.

Example 5

After the pyridine hydrochloride was removed the temperature was raised to a temperature in the range 280 to 300° C., at which temperature the niobium chloride sublimed. Recovery was good, although it undoubtedly was poorer if the pyridine hydrochloride and other reducing substances had not been removed adequately. Pure $Nb_2O_5$ was used as starting material, and an 80% recovery of the niobium was obtained. The unrecovered residue was fused again and recycled. Recovery of niobium chloride from treatment of ferro-niobium was less successful presumably because of the reducing action of the iron atoms giving a lower valent, non-volatile chloride of niobium. Experiments of a similar nature using oxidic compounds of tantalum, molybdenum, tungsten and zirconium showed qualitatively that in each case the volatile chlorides are produced, although recovery was not very good in the case of molybdenum and poor for tungsten.

What we claim is:

1. A process for effecting the separation of the volatile chlorides of zirconium, niobium, tantalum and molybdenum from their ores, comprising treating said ore with molten pyridinium chloride in sufficient quantity not only to effect the stoichiometric conversion of said ore to the corresponding chloride but in sufficient excess to dissolve the soluble reaction products, at a temperature between the melting point of pyridinium chloride and the boiling point of the solution, for a length of time sufficient to dissolve at least a portion of said ore, whereby volatile reaction products are driven off, the resulting solution being heated in vacuo at a temperature and for a time sufficient to volatilize the pyridinium chloride and to effect essentially complete sublimation of the metal chloride.

2. A process as claimed in claim 1 wherein said ore is previously fused with an alkaline flux.

3. A process as claimed in claim 1 wherein said resulting solution is subjected to further treatment to remove pyridinium chloride by heating in vacuo at a temperature between 160° and 180° C.

4. A process as claimed in claim 1 wherein the treatment for separation of the metal chloride from the non-volatile materials is carried out in the presence of a small concentration of dry hydrogen chloride equivalent to a pressure of 1 to 2 cm. Hg.

5. A process as claimed in claim 1 wherein the ore is an ore of niobium and wherein following the volatilization of the pyridinium chloride the residue is heated in vacuo to a temperature between 280° and 300° C.

6. A process as claimed in claim 1 wherein said ore is ferroniobium.

References Cited

UNITED STATES PATENTS

| | | | |
|---|---|---|---|
| 2,932,553 | 4/1960 | Didtschenko | 23—23 X |
| 3,128,150 | 4/1964 | Brothers | 23—87 |
| 3,153,570 | 10/1964 | Domning et al. | 23—15 X |
| 3,235,328 | 2/1966 | Lerner et al. | 23—15 |

OSCAR R. VERTIZ, *Primary Examiner.*

HERBERT T. CARTER, *Examiner.*